Oct. 8, 1968 H. H. HEIGHTON ET AL 3,405,098
PROCESS FOR PREPARING HIGH VISCOSITY LINEAR CONDENSATION
POLYESTERS FROM PARTIALLY POLYMERIZED
ALYCOL TEREPHTHALATES
Filed Oct. 29, 1965 2 Sheets-Sheet 1

INVENTORS
HAROLD H. HEIGHTON
ELMER E. MOST, JR.

BY *Norris E. Ruchman*

ATTORNEY

INVENTORS
HAROLD H. HEIGHTON
ELMER E. MOST, JR.

ATTORNEY

3,405,098
PROCESS FOR PREPARING HIGH VISCOSITY LINEAR CONDENSATION POLYESTERS FROM PARTIALLY POLYMERIZED GLYCOL TEREPHTHALATES
Harold H. Heighton and Elmer E. Most, Jr., Kinston, N.C., assignors to E. I. du Pont de Nemours and Company, Wilmington, Del., a corporation of Delaware
Continuation-in-part of application Ser. No. 417,004, Dec. 9, 1964. This application Oct. 29, 1965, Ser. No. 513,616
6 Claims. (Cl. 260—75)

This is a continuation-in-part of our application Ser. No. 417,004, filed Dec. 9, 1964, now abandoned. The invention relates to an improved process for preparing high viscosity linear condensation polyesters from partially polymerized glycol terephthalates, and is more particularly concerned with fluidized-bed solid phase polymerization of polyethylene terephthalate.

Polyethylene terephthalate of high molecular weight, having an intrinsic viscosity of 0.8 and higher, is desirable for preparing industrial yarns wherein the increased molecular weight of the polymer results in yarns of increased strength. Such high viscosity polymer is not readily prepared, if at all, by melt-polymerization techniques because of the difficulty of processing highly viscous masses and because attempts to increase the temperature to reduce the viscosity results in polymer degradation.

Solid phase polymerization, wherein a low molecular weight prepolymer is further polymerized at temperatures below the melting point, is effective for producing polymer of high intrinsic viscosity without polymer degradation. In order to provide reasonable rates of polymerization, it is necessary to provide for uniform heating and rapid removal of condensation by-products. This can be accomplished by a fluidized-bed solid phase polymerization, in which the material is polymerized in the form of particles of sufficient fineness to be agitated in a gas stream and be handled like a liquid. A commercial process for solid phase polymerization of polyamides in this manner is disclosed by Monroe in U.S. Patent No. 3,031,433, issued Apr. 24, 1962.

Attempts to use fluidized-bed polymerization to prepared polyethylene terephthalate on a commercial scale have encountered serious difficulties. Polyester of less than 0.8 intrinsic viscosity is conventionally prepared by melt polymerization of the monomer components and then rapidly quenching the molten polyester, as by casting on a water-cooled surface. This gives an amorphous product. Amorphous polyethylene terephthalate is quite tough and difficult to grind into particles with conventional equipment. It also has a low melting point, e.g., 120° C. for polyester of 0.4 intrinsic viscosity, which causes agglomeration of particles during grinding and in the fluidized-bed.

A highly crystalline product can be obtained by slow cooling of the molten polyester, e.g., by casting the polyester as a thick sheet which is allowed to cool slowly. This crystalline polyester can be ground to suitable particle sizes without difficulty in commonly available grinding machines. Furthermore, the crystalline melting point is about 265° C. and polymerization temperatures up to 235° C. can be used without agglomeration of particles. However, it is found that the rate of polymerization is excessively slow and that an intrinsic viscosity of 0.8 is not reached, even after many hours of heating at temperatures below 235° C.

The present invention provides an improved process suitable for preparing polyethylene terephthalate of unusually high intrinsic viscosity. It also provides for solid phase polymerization at rapid rates without agglomeration of particles or degradation of polymer. Other advantages of the invention will become apparent from the specification and drawings.

In accordance with this invention polyethylene terephthalate having an intrinsic viscosity of 0.20 to 0.65 is first prepared by polymerizing monomer components in a conventional manner to give an amorphous melt of prepolymer. The melt is quenched rapidly to form a substantially amorphous solid prepolymer and this is broken into chips. The prepolymer chips are heated at 150° C. to 200° C. until the polyester is partially crystallized. Preferably the polyester is heated at about 160° C. for at least 10 minutes, or until polyethylene terephthalate has a density within the range of 1.39 to 1.40. The partially crystallized polyester is next ground into particles passing a 20-mesh screen, with less than 10% fine enough to pass through a 200-mesh screen. Preferably the particles pass through a 40-mesh screen and are retained on a 100-mesh screen. The polyester is then polymerized to an intrinsic viscosity of at least 0.8 by heating the particles at 200° C. to 235° C. in a fluidized bed. Preferably this solid phase polymerization is conduced at 215° C. to 225° C.

In the drawings, which illustrate the invention:

Figure 1:
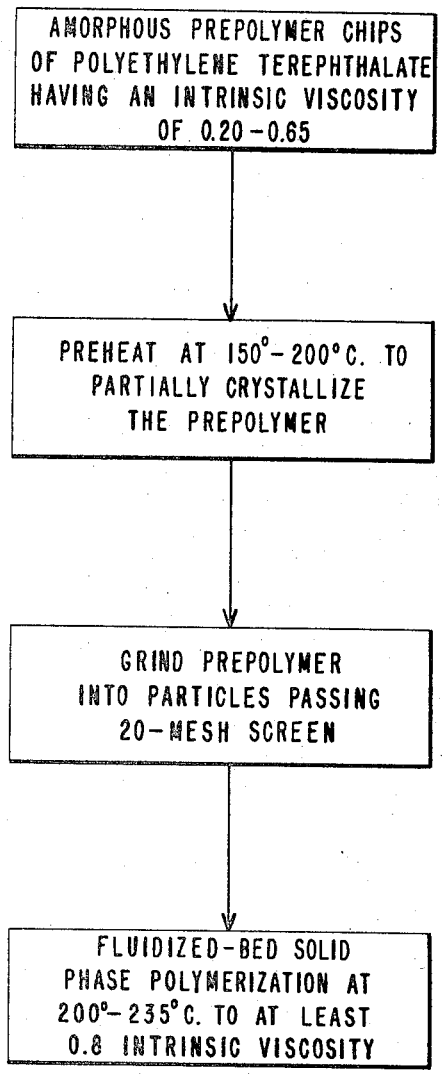
FIGURE 1 is a flow diagram to illustrate the process of this invention.

The process of FIGURE 1 may be carried out by charging the amorphous prepolymer chips to a conventional type of preheater wherein the chips are heated to a temperature of 150–200° C. to partially crystallize the prepolymer. After crystallization, the chips may be ground with conventional equipment to the desired particle size and charged to a fluidized-bed polymerizer, such as one of the type disclosed in Monroe U.S. Patent No. 3,031,433.

The polyethylene terephthalate prepolymer used in the practice of this invention may be prepared in any suitable manner known to the art. The polymerization is carried out to produce a prepolymer having an intrinsic viscosity between 0.20 and 0.65, preferably about 0.40. The prepolymer is broken into chips that will pass through 0.125-inch openings of a screen. The chips are ground into particles after they have been heated to induce partial crystallization. Prepolymer having an intrinsic viscosity less than about 0.20 results in the formation of excessive fines, for example, as much as 50% or more will pass through a standard 200-mesh screen when subsequently ground in conventional grinding equipment. Above an intrinsic viscosity of about 0.65, the prepolymer becomes very difficult to grind and, further, requires longer heating periods to obtain sufficient crystallinity to prevent or minimize fusing of the particles during the polymerization. The preferred intrinsic viscosity is about 0.4, which represents a compromise between those conditions in that it allows the preparation of a crystalline prepolymer in a reasonable period of time and the resulting material can be readily ground to the desired particle size with less than 10% fines.

Amorphous polyethylene terephthalate having an intrinsic viscosity of 0.4 has a melting point of 120° C. Since solid-phase polymerizations must be carried out at temperatures of at least about 200° C. to provide suitable rates of polymerization, and since at these temperatures the amorphous prepolymer melts before it can crystallize, the disadvantage of an amorphous prepolymer is apparent.

Polyethylene terephthalate crystals have a melting point of about 265° C. and prepolymers having a relatively high percent of crystallinity are quite suitable. The crystallinity developed in an amorphous prepolymer by heating it at a temperature of about 160° C. for at least 10 minutes is sufficient to permit its use for solid-phase polymerization at temperatures up to about 235° C. without its becoming tacky or otherwise interfering with the efficiency of the operation. Further, the crystallinity developed at 160° C. is such that grinding is readily accomplished. With respect to the ease of grinding, no significant difference is noted between samples heated at 150° C. and those heated at temperatures of 200° C. and higher.

The invention is most advantageously used in a continuous, fluidized-bed, solid-phase polymerization process. The temperature at which the preheat step is carried out lies between 150° and 200° C. A temperature of about 160° C. is preferred since it leads to optimum results. A preheat temperature of about 160° C. gives the maximum rate of polymerization and the ground prepolymer can be used in fluidized-bed polymerization at temperatures up to about 235° C. without becoming tacky and thus impairing the fluidization of the bed. Preheat temperatures as low as 150° C. may be used to advantage but at some sacrifice in bed fluidization unless somewhat lower bed temperatures are used. Preheat temperatures up to 200° C. may be used to prepare polymer having an intrinsic viscosity of about 0.8 at which point the increase in polymerization time becomes excessive for the higher temperatures. Apparently, preheat temperatures above 160° C. decrease polymer chain end mobility and glycol diffusion rate, thus retarding polymerization rates. For intrinsic viscosities desired for industrial yarns such as those above about 0.8, a preheat temperature of about 160° C. is especially preferred. For example, a prepolymer sample preheated at 160° C. for 15 minutes will reach an intrinsic viscosity of 0.8 at a polymerization temperature of 217° C. in about one-half the time required for a prepolymer sample preheated at 217° C. for 15 minutes. At intrinsic viscosities greater than 0.9, the difference in polymerization times to reach a given level becomes even more pronounced.

In preheating the prepolymer chips, it is desirable, of course, to bring the prepolymer to the desired temperature as rapidly as possible without, however, heating so rapidly that the prepolymer fuses into a mass before it begins to crystallize. The melting point rises rapidly as crystallization occurs and, after initial crystallization has occurred, the prepolymer can then be heated to the final crystallization temperature, in the range of 150° to 200° C., without fusion occurring. Crystallization to a density of 1.39 to 1.40 occurs quickly at the temperatures indicated in FIGURE 3, a few minutes being sufficient. The time required will, of course, vary with the bulk of the prepolymer being heated and the heating equipment. Suitable conditions to prevent particle fusing will be apparent to those skilled in the art. No significant change occurs in the intrinsic viscosity during the preheat period.

Figure 3:
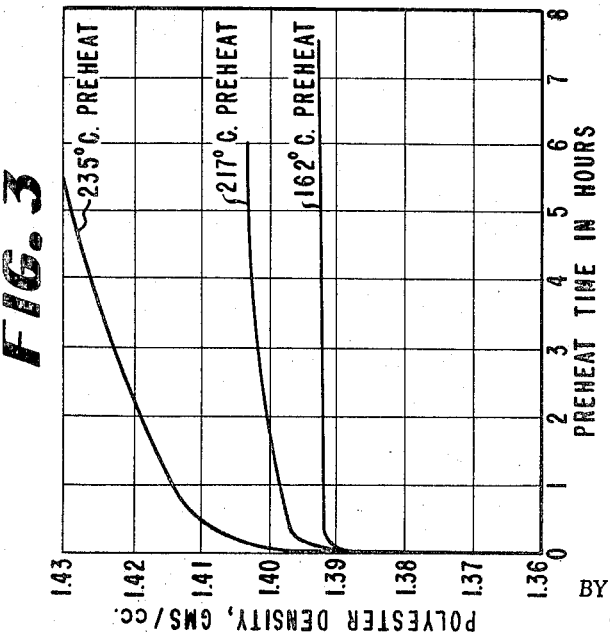
FIGURE 3 is a plot of polyester density vs. time of preheat for different preheat temperatures.

As shown by FIGURE 3, a preheat temperature of 160° C. offers the additional advantage of reaching a constant level of crystallinity, as reflected by density measurements. Such a characteristic is especially advantageous in a continuous process wherein it is relatively easy to control the uniformity of the product, particularly in the event of delays resulting from difficulties occurring in a subsequent stage of the process.

After the desired preheating, the prepolymer is ground to the desired particle size. The particle size may be between 20 and 200 mesh. As is well known, the smaller particle sizes result in faster polymerization rates. However, grinding the prepolymer to too small a particle size results in a high proportion of fines which are objectionable in a fluidized-bed process. Accordingly, it is preferred that the particle sizes be between 40 and 100, i.e., the ground particles will pass a 40-mesh screen but will be substantially all retained by a 100-mesh screen.

The ground prepolymer is then polymerized to the desired intrinsic viscosity by well-known, solid-phase polymerization methods at temperatures above 200° C. The preferred polymerization temperatures lie between 215° and 225° C. Below 215° C. the rates are so slow that the process may be uneconomical and above 225° C. fluidization of the particles may be difficult to maintain in a continuous process because of agglomeration. Above 235° C., agglomeration occurs no matter how crystalline the prepolymer may be.

A further advantage realized by solid-phase polymerization in accordance with this invention is production of polymer containing very few free carboxyl groups. The unexpected susceptibility of polyester fibers to heat degradation in contact with rubber has been described by Daniels in U.S. Patent No. 3,051,212, dated Aug. 28, 1962 which teaches the importance of a low concentration of free carboxyl groups in the polymer in controlling such degradation. The high molecular weight polyester prepared by the present invention is found to have less than 10 free carboxyl equivalents per million grams, whereas a high molecular weight polyester prepared by conventional and well-known melt polymerization is found to have greater than 20 carboxyl eq./$10^6$ g. of polyester.

Intrinsic viscosity is determined at 25° C. in an Ostwald viscometer using a solution of 0.32 gram of the polyethylene terephthalate in 100 ml. of a solution of 75% methylene chloride and 25% trifluoroacetic acid. The values reported are accurate to within ±0.02.

As is well known (see "Crystallization of Polymers" by Leo Mandelkern, pages 215–218, McGraw-Hill Book Co., 1964), as the degree of crystallinity of a polymer increases, the polymer becomes increasingly dense. The density values given herein were measured in a density gradient tube against standards established with carbon tetrachloride as the heavy liquid and n-heptane as the light liquid.

EXAMPLE I

This example describes the preparation of a prepolymer useful in the practice of this invention. Bis-$\beta$-hydroxyethyl terephthalate is prepared continuously from ethylene glycol and dimethyl terephthalate by the method of Vodonic, U.S. Patent No. 2,829,153, dated Apr. 1, 1958, using a catalyst comprising manganous acetate and antimony oxide. This "monomer" is then supplied continuously to a polymerization system where the temperature is raised and the pressure reduced to produce polyethylene terephthalate prepolymer. The final stages of polymerization are carried out at a temperature of about 270° C. and a pressure of about 4 mm. of mercury, using the finishing apparatus described by Willey in U.S. Patent No. 3,046,099, dated July 24, 1962, the presssure being controlled to give the desired intrinsic viscosity. The outlet end of the finisher is fitted with a screw pump similar to that described by Bendett in U.S. Patent No. 2,805,627, dated Sept. 10, 1957, to facilitate the transfer of prepolymer directly to a casting machine. Molten prepolymer is extruded through a 3-inch slot onto a chilled casting wheel to obtain a glassy amorphous ribbon which is then cut to pass 0.125-inch openings of a screen to give a supply of amorphous prepolymer chips. The prepolymer has an intrinsic viscosity of 0.39.

The amorphous prepolymer is then ground to a particle size of 60–80 mesh in a rotary mill. The amorphous prepolymer is ground, contrary to the preferred sequence, prior to preheating to give a uniform supply for test purposes and to eliminate the inconvenience of grinding the small amounts of prepolymer used in the experiments described in Examples II–IV.

EXAMPLE II

Sufficient prepolymer of Example I to give six 1-gram samples is heated, under dry nitrogen, at 160° C. for 15 minutes in a glass tube to cause crystallization and is then cooled.

After preheating, one-gram samples of the prepolymer are placed in the bottoms of 30-millimeter diameter glass polymer-tubes. Six tubes are used and they are connected to a common manifold and vacuum maintained by an oil diffusion pump. The tubes are immersed in a common, stirred, silicone oil bath maintained at a temperature of about 218° C., at which temperature the center of the polymer bed reaches the polymerization temperature within 5 minutes. At one-hour intervals, a tube is removed from the bath and allowed to cool to room temperature without breaking vacuum. The sample is then removed from the tube and its intrinsic viscosity determined. The conditions and results obtained are shown in Table 1 and identified as Run 1.

In separate runs, the above procedure is repeated except for the preheat temperature. In Runs 2, 3, 4, and 5 the preheat temperature is 190° C., 200° C., 218° C. and 235° C., respectively.

TABLE 1.—POLYMERIZATION CONDITIONS

| | Preheat Temp., °C. | Time (hours) | Temp. (°C.) | Press. (mm. Hg) | Intrinsic Viscosity |
|---|---|---|---|---|---|
| Run 1 | 160 | 0 | | | 0.40 |
| | | 1 | 216 | 0.007 | 0.62 |
| | | 2 | 219 | 0.006 | 0.81 |
| | | 3 | 218 | 0.006 | 0.93 |
| | | 4 | 218 | 0.006 | 1.00 |
| | | 5 | 218 | 0.006 | 1.02 |
| | | 6 | 218 | 0.005 | 1.10 |
| Run 2 | 190 | 0 | | | 0.40 |
| | | 1 | 218 | 0.006 | 0.67 |
| | | 3 | 218 | 0.005 | 0.88 |
| | | 4 | 216 | 0.005 | 0.91 |
| | | 6 | 216 | 0.005 | 1.02 |
| Run 3 | 200 | 0 | | | 0.40 |
| | | 1 | 218 | 0.005 | 0.65 |
| | | 2 | 216 | 0.005 | 0.74 |
| | | 3 | 218 | 0.004 | 0.88 |
| | | 4 | 218 | 0.004 | 0.89 |
| | | 5 | 216 | 0.004 | 0.93 |
| | | 6 | 216 | 0.004 | 1.00 |
| Run 4 | 218 | 0 | | | 0.40 |
| | | 1 | 218 | 0.006 | 0.56 |
| | | 2 | 212 | 0.006 | 0.65 |
| | | 3 | 218 | 0.006 | 0.68 |
| | | 4 | 218 | 0.007 | 0.84 |
| | | 5 | 218 | 0.007 | 0.84 |
| | | 6 | 218 | 0.007 | 0.92 |
| Run 5 | 235 | 0 | | | 0.40 |
| | | 1 | 218 | 0.005 | 0.40 |
| | | 2 | 216 | 0.005 | 0.42 |
| | | 3 | 216 | 0.005 | 0.60 |
| | | 4 | 218 | 0.005 | 0.60 |
| | | 5 | 216 | 0.004 | 0.65 |
| | | 6 | 215 | 0.004 | 0.67 |

Figure 2:
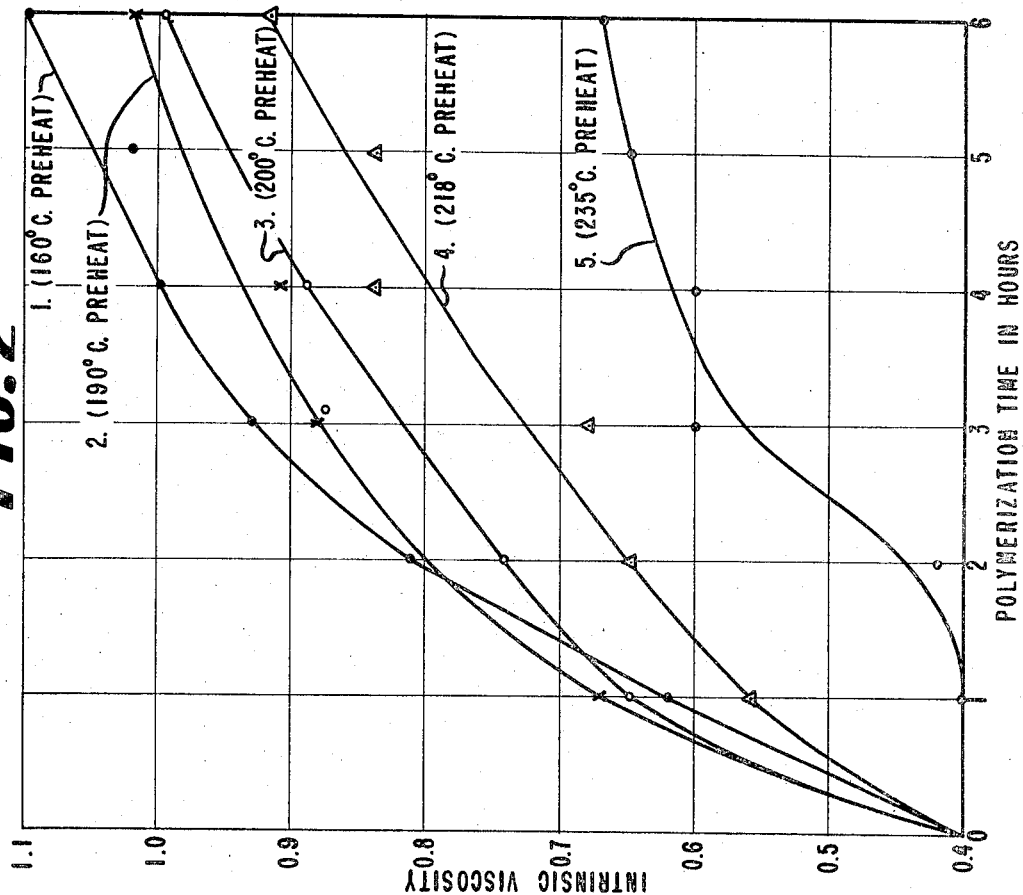
FIGURE 2 is a plot of data from Example II, showing the change of intrinsic viscosity with time of polymerization for propolymer samples which have previously been crystallized at different preheat temperatures.

The data from this example are plotted in FIGURE 2. The disadvantage of exposing the prepolymer to high temperatures, such as occurs in a slow cooling of the melt, is shown by Run 5 wherein an intrinsic viscosity of 0.7 is not achieved even after 6 hours of polymerization.

EXAMPLE III

This example shows the added advantage of using a 160° C. preheat temperature in that 160° C. permits the ready preparation of a uniform product in terms of crystallinity as reflected by density measurements. Samples of the amorphous prepolymer of Example I are crystallized at temperatures of 160° C., 217° C., and 235° C. for periods of time up to 7.5 hours. At intermediate times, the densities of the prepolymer samples are determined by removing portions and evaluating them in a density gradient tube as previously described. The results are shown in FIGURE 3. As can be seen from the graph, the sample preheated at 160° C. reaches a maximum crystallinity in 15 minutes and the value remains constant for as long as 7.5 hours. At 217° C. the crystallinity approaches a maximum in 15 minutes but slowly increases over a six-hour period. At 235° C., the crystallinity is still increasing after more than five hours of preheat.

EXAMPLE IV

This example shows the advantage of this invention at an increased polymerization temperature.

Samples of the amorphous prepolymer of Example I are preheated, in Runs 6 and 7 at temperatures of 190° C. and 215° C., respectively, for 15 minutes as described in Example II. The prepolymer so treated is then polymerized using the procedure of Example II except that a polymerization temperature of 225° C. and a pressure of 0.005–0.006 millimeter of mercury is maintained during the polymerizations. The results are given in Table 2.

TABLE 2

| | Preheat Temp., °C. | Polymerization Time (hours) | Intrinsic Viscosity |
|---|---|---|---|
| Run 6 | 190 | 0 | 0.40 |
| | | 1 | 0.78 |
| | | 2 | 0.94 |
| | | 3 | 1.03 |
| | | 4 | 1.10 |
| | | 5 | 1.14 |
| | | 6 | 1.24 |
| Run 7 | 215 | 0 | 0.40 |
| | | 1 | 0.65 |
| | | 2 | 0.78 |
| | | 3 | 0.82 |
| | | 4 | 0.92 |
| | | 5 | 0.97 |
| | | 6 | 1.02 |

In this example, a preheat temperature of 190° C. results in a polymer having an intrinsic viscosity of 0.8 in about 1.1 hours, and a value of 1.0 in about 2.6 hours while the higher temperature requires about twice as long to reach the same viscosity levels. The economic advantage of a controlled preheat step is readily apparent.

EXAMPLE V

Amorphous prepolymer prepared as in Example I, and having an intrinsic viscosity of approximately 0.40 is crystallized by heating at a temperature of 160° C. for 2 hours before grinding to a particle size of 60–80 mesh in a rotor and stator-type grinder. The cold, ground prepolymer (36.29 kilograms) is heated 12 hours at 160° C., charged directly to a fluidized bed polymerizer, and the batch temperature is raised to 200° C. during 1.25 hours. The temperature is then raised to 220° C. during the next three hours and held at this temperature for 18 hours and 35 minutes. Dry, hot inert gas is passed through the bed to remove volatiles, supply heat and to maintain fluidization. A sample removed at the end of polymerization is found to have an intrinsic viscosity of 1.22.

The process of this invention is also suitable for the preparation of high viscosity poly(trimethylene terephthalate) as illustrated in the following example:

EXAMPLE VI

Poly(trimethylene terephthalate) flake with intrinsic viscosity of 0.59 and density of 1.33 g./cm.³ is divided into batches of about 65 pounds each and preheated at 160° C. for 2 hours to affect crystallization as indicated by an increase in polymer density to 1.34 g./cm.³. Crystallized flake is cut twice through a mill using a screen with 1/16 inch diameter holes. The finer flake is preheated again for 6 hours at 165° C. before charging. After charging to the fluidized bed polymerizer, the flake is heated to 210° C. with inert gas for 8 hours. At the end of this polymerization cycle, the intrinsic viscosity averages 1.23.

Since many different embodiments of the invention may be made without departing from the spirit and scope thereof, it is to be understood that the invention is not limited by the specific illustrations except to the extent defined in the following claims.

We claim:

1. In the preparation of linear condensation polyesters wherein glycol terephthalate is partially polymerized to form an amorphous melt of polyester, the melt is solidified and the polymerization is continued in the solid phase, the process for preparing polyester of unusually high intrinsic viscosity which comprises the combination of steps:

(a) quenching the melt rapidly to form a substantially amorphous solid polyester, the molten polyester being partially polymerized to an intrinsic viscosity of 0.20 to 0.65 when quenched,
(b) heating the solid polyester at 150° to 200° C. to form a partially crystallized polyester,
(c) grinding the partially crystallized polyester into particles passing a 20-mesh screen, with less than 10% fine enough to pass through a 200-mesh screen, and
(d) polymerizing the ground polyester at 200° to 235° C. in a fluidized-bed solid-phase polymerization to an intrinsic viscosity of at least 0.8.

2. A process as defined in claim 1 wherein the polyester is polyethylene terephthalate and is quenched in step (a) at an intrinsic viscosity of about 0.4.

3. A process as defined in claim 1 wherein the polyester is heated in step (b) at about 160° C. for at least 10 minutes to develop crystallinity.

4. A process as defined in claim 1 wherein the partially crystallized polyester is ground in step (c) to particles which pass through a 40-mesh screen and are retained on a 100-mesh screen.

5. A process as defined in claim 1 wherein the polyester is polymerized in step (d) at 215° to 225° C. to an intrinsic viscosity of at least 0.8 in less than 3 hours.

6. A process as defined in claim 1 wherein the polyester is polymerized in step (d) at 215° to 225° C. to a high molecular weight polyester having less than 10 free carboxyl equivalents per million grams of polyester.

References Cited

UNITED STATES PATENTS

| | | | |
|---|---|---|---|
| 3,075,952 | 1/1963 | Coover et al. | 260—75 |
| 3,117,950 | 1/1964 | Kibler et al. | 260—75 |
| 3,305,532 | 2/1967 | Middleburg et al. | 260—75 |
| 3,344,091 | 9/1967 | Russin et al. | 260—2.3 |

WILLIAM H. SHORT, *Primary Examiner.*

LOUISE P. QUAST, *Assistant Examiner.*